United States Patent
Wendte

[19]

[11] Patent Number: 6,070,673
[45] Date of Patent: Jun. 6, 2000

[54] LOCATION BASED TRACTOR CONTROL

[75] Inventor: Keith W. Wendte, Hinsdale, Ill.

[73] Assignee: Case Corporation, Racine, Wis.

[21] Appl. No.: 09/157,816

[22] Filed: Sep. 21, 1998

Related U.S. Application Data

[63] Continuation-in-part of application No. 08/755,167, Nov. 22, 1996, Pat. No. 5,961,573, which is a continuation-in-part of application No. 08/754,926, Nov. 22, 1996, Pat. No. 5,938,709, which is a continuation-in-part of application No. 08/754,905, Nov. 22, 1996, Pat. No. 5,902,343.

[51] Int. Cl.[7] .............................................. G06F 165/000
[52] U.S. Cl. .................................. 172/2; 701/50
[58] Field of Search ................................. 701/50; 172/4, 172/2, 4.5

[56] References Cited

U.S. PATENT DOCUMENTS

| | | | |
|---|---|---|---|
| 4,413,685 | 11/1983 | Gremelspacher et al. | 172/316 |
| 4,657,087 | 4/1987 | Livneh | 172/4 X |
| 5,442,552 | 8/1995 | Slaughter et al. | 701/50 |
| 5,646,846 | 7/1997 | Bruce et al. | 701/50 |
| 5,709,271 | 1/1998 | Bassett | 172/4 |
| 5,809,440 | 9/1998 | Beck et al. | 701/50 |
| 5,894,894 | 4/1999 | Szymczak | 701/50 X |
| 5,902,343 | 5/1999 | Hale et al. | 701/50 |
| 5,913,915 | 6/1999 | McQuinn | 701/50 |
| 5,919,242 | 7/1999 | Greatline et al. | 701/50 |
| 5,923,270 | 7/1999 | Sampo et al. | 701/50 X |
| 5,928,309 | 7/1999 | Korver et al. | 70/50 X |
| 5,931,882 | 8/1999 | Fick et al. | 701/50 |
| 5,938,709 | 8/1999 | Hale et al. | 701/50 |
| 5,945,917 | 8/1999 | Harry | 701/50 X |
| 5,955,973 | 9/1999 | Anderson | 701/50 X |
| 5,961,573 | 10/1999 | Hale et al. | 701/50 X |
| 5,974,348 | 10/1999 | Rocks | 701/50 X |

*Primary Examiner*—Christopher J. Novosad
*Attorney, Agent, or Firm*—Foley & Lardner

[57] ABSTRACT

A global positioning system (GPS) based soil tillage system is disclosed herein. The system includes an agricultural implement such as a plow having electro-hydraulically controlled plow elements which may include plow points, furrowers, ripple coulters, disks, sweeps, tines, etc. The system also includes a control system for monitoring the location of the implement relative to the field, and determining the desired tilling orientation between the plow element and the soil. More specifically, the control system determines the location of the implement based upon a GPS signal, compares the location to a location stored in a data file, and looks up the desired tilling orientation in the data file associated with the location. Based upon the tilling orientation selected from the data file, the control system applies appropriate signals to the electro-hydraulic controls which move the plow elements to the desired orientation. The system can also be used for applications other than tilling where there is an interaction with the soil. For example, control of the depth of ground opening of a seed planting implement may also be provided with the disclosed system.

27 Claims, 6 Drawing Sheets

| DATA POINT | LOCATION | | ALTITUDE, FT. ABOVE S.L. | TOOL POSITION | GROUND SPEED |
| --- | --- | --- | --- | --- | --- |
| | LONGITUDE | LATITUDE | | INCHES | MPH |
| ... 699 700 701 ... | ... -88.7291520 -88.7291140 -88.7290720 ... | ... 39.0710720 39.0710720 39.0710740 ... | ... 770 771 669 ... | ... 8.7 9.2 8.9 ... | ... 2.1 2.1 1.9 ... |

302

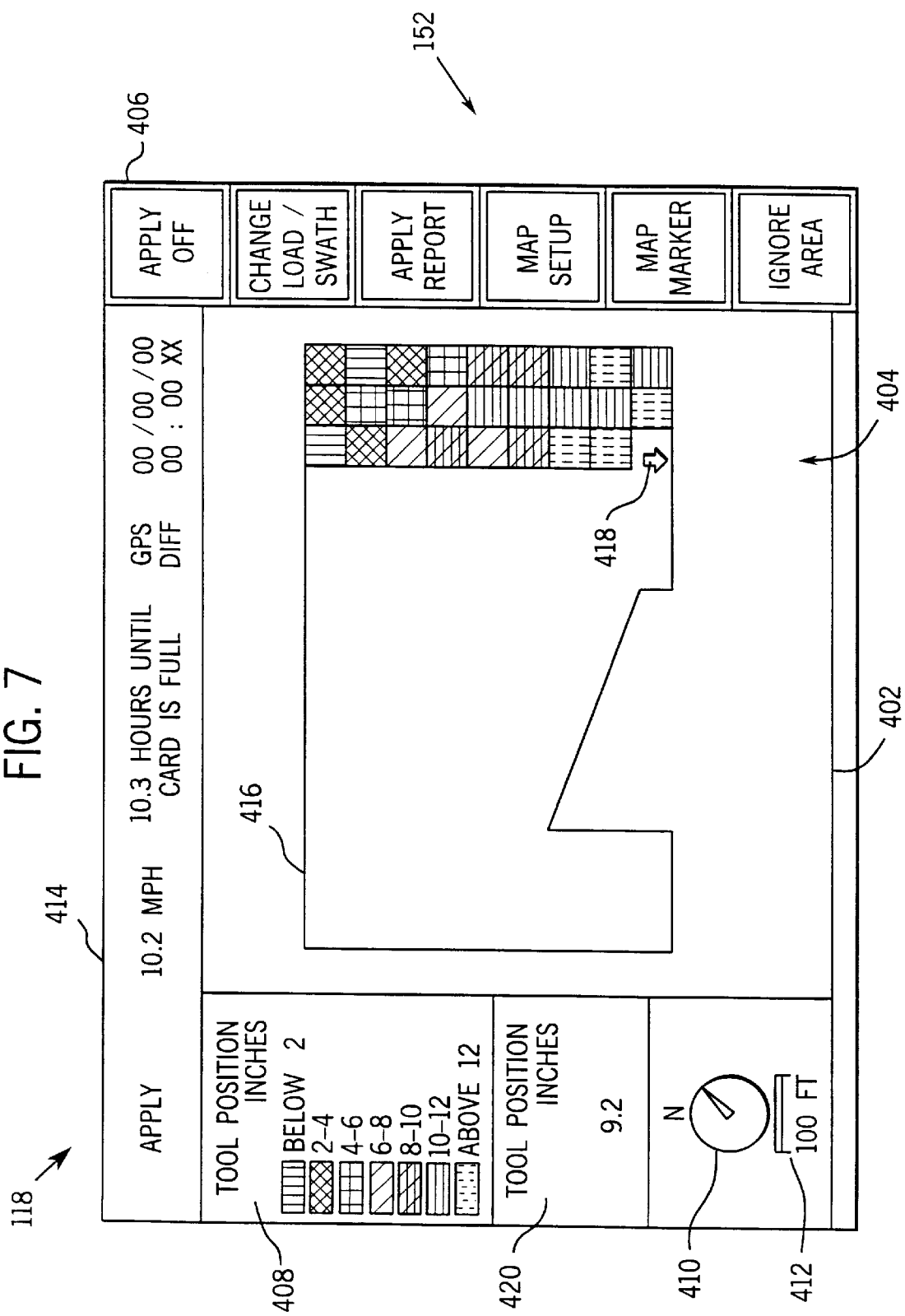

LOCATION BASED TRACTOR CONTROL

CROSS-REFERENCE TO RELATED APPLICATIONS

This application is a continuation-in-part of U.S. application Ser. No. 08/755,167, filed Nov. 22, 1996 entitled "Height Control of an Agricultural Tool in a Site-Specific Farming System", issued on Oct. 5, 1999 to Hale et al. as U.S. Pat. No. 5,961,573 which is also a continuation-in-part of U.S. application Ser. No. 08/754,926, filed Nov. 22, 1996 entitled "Panning Display of GPS Field Maps", issued on Aug. 17, 1999 to Hale et al. as U.S. Pat. No. 5,938,709 which is also a continuation-in-part of U.S. application Ser. No. 08/754,905, filed Nov. 22, 1996 entitled "Automatic Scaling of GPS Field Maps", issued on May 11, 1999 to Hale et al. as U.S. Pat. No. 5,902,343.

FIELD OF THE INVENTION

The present invention relates to controlling an agricultural vehicle and associated equipment based upon the location of the vehicle. In particular, the present invention relates to controlling the settings or configuration of an implement associated with the agricultural vehicle based upon the location thereof in an agricultural field.

BACKGROUND OF THE INVENTION

The management of agricultural fields has been an ongoing concern of farmers. Many factors complicate the process of field management, such as environmental considerations, crop type and rotation, soil type variability, depth of topsoil, field topography, etc. In response to the challenges presented in field management, farmers continue to improve their field management techniques and tools.

One known field management technique is the use of selective field tillage. More specifically, to conserve soil and energy many farmers no longer completely plow or till fields on a yearly basis and/or till only selected areas of the field. Thus, a farmer may rotate the areas of a field which are tilled in a given year and may avoid tilling problem areas in a field. For example, portions of fields which are near a stream and inclined toward the stream may be infrequently tilled to avoid runoff into the stream.

Tools currently available that are used to facilitate field management techniques in the form of tillage control are planters which permit planting in field areas which are not tilled. One example is the Case 5400 No-Till Grain Drill planter. This seed drill permits the farmer to plant seeds in untilled or mulch-tilled fields. Other examples are the Case Early Riser® brand planters, which also permit seeds to be planted in, untilled, mulch-tilled and tilled fields. Some tools are available to aid in tillage control but are directed to the problems of planting in untilled or mulch-tilled fields. It would also be desirable to improve the tools available for use in the process of tilling.

To improve the tools available for tillage control, it would be desirable to provide plows, drags and other soil disturbing tools which are adjustable and controllable. These features would permit the farmer to modify the type and degree of tillage while moving through the field, and would give the farmer more variability in the degree of tillage to more closely match the amount of tillage required. Furthermore, it would also be desirable to provide more adjustable and controllable planters. To further improve control of the tools available for tilling and planting fields, it would be desirable to control the tools based upon the horizontal and vertical position of the particular tool within the field using a positioning system such as that provided by satellite based global positioning systems (GPS).

SUMMARY OF THE INVENTION

The present invention provides a location based soil working system. The system includes a tool support frame supported relative to the soil, and a tool movably supported by the frame for orientation relative to the soil. The tool is configured to disturb the soil and may take varying forms such as the planting portion of an air-drill type seed planter, a plow point, tine, disk, furrower, ripple coulter, sweep, etc. The system also includes an actuator coupled between the tool and the frame to move the tool relative to the frame in response to an actuation signal, and a location sensing circuit coupled to the frame to generate a location signal representative of a location of the tool within the portion of land. A control circuit is coupled to the actuator and the sensing circuit to monitor the location signal and generate the actuation signal based upon the location signal.

The present invention further provides an agricultural field working system including a tractor, a soil working device including a frame attached to the tractor and supported relative to the soil of the field, and a tool movably supported by the frame for orientation relative to the soil, wherein the tool is configured to disturb the soil. An actuator is coupled between the tool and the frame to move the tool relative to the frame in response to an actuation signal, and a position sensor is coupled to the tool to generate a tool position signal representative of the position of the tool. The system also includes a location sensing circuit coupled to the system to generate a location signal representative of a location of the tool within the portion of land. A control circuit is coupled to the actuator, the position sensor and the location sensing circuit to monitor the location signal, and generates the actuation signal based upon the position signal and location signal.

The present invention also provides a method for selectively disturbing the soil of a field using an earth working device based upon the location of the device within the field. The method includes the steps of moving the device across the field, determining a location of the device within the field, determining a relationship between the device and the soil based upon the location of the device, and orienting the device relative to the soil to produce the relationship between the device and the soil. The steps of determining and orienting are repeated as the device moves through the field.

Other aspects of the present invention relate to controllably variable engagement with soil of a field of agricultural vehicles and implements. These may include, but are not limited to, parameters such as seed planting depth; row unit down pressure and seedbed furrow closing device down pressure for a planting implement; height adjustment of a planting implement residue manager for residue or waste of previously grown and harvested crops; disk harrow, and similar soil penetration device, gang angle adjustment; and raising a tillage tool entirely out of engagement with the soil to prevent erosion in response to topographic data layers of GIS maps, as well as the tillage depth control referred to above.

BRIEF DESCRIPTION OF THE DRAWINGS

The invention will become more fully understood from the following detailed description, taken in conjunction with the accompanying drawings, wherein like reference numerals refer to like parts.

FIG. 7 shows an application screen on the electronic display shown in FIG. 3.

DETAILED DESCRIPTION OF THE PREFERRED EMBODIMENTS

Figure 1:
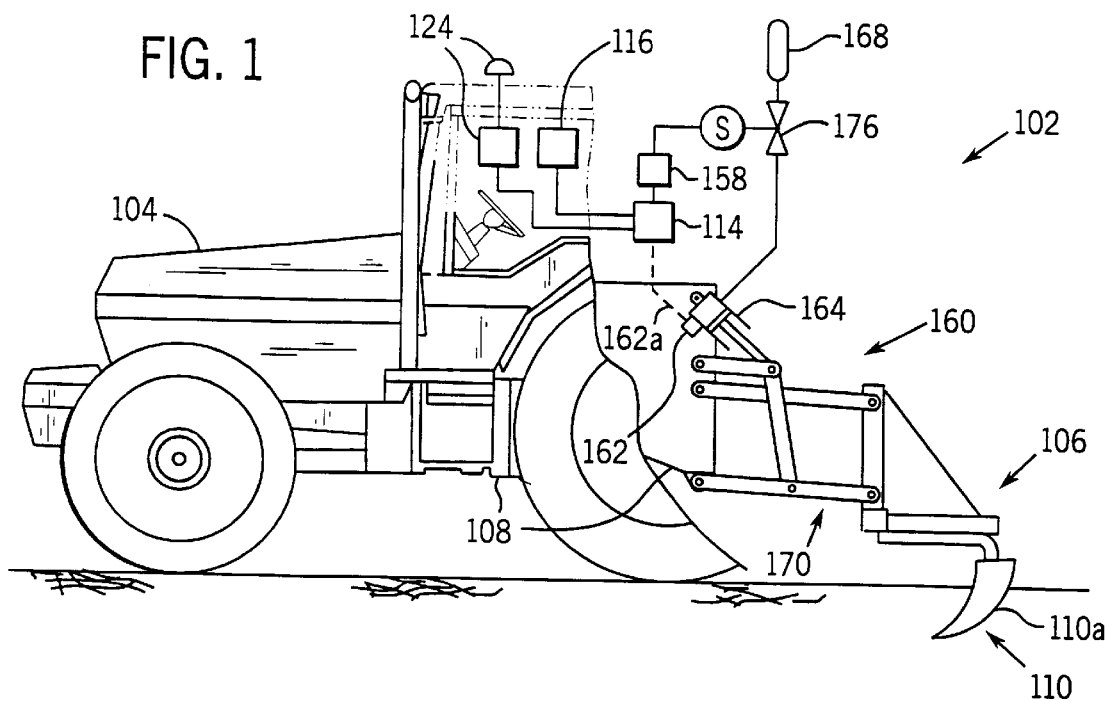
FIG. 1 is a fragmentary side elevation view of a site-specific farming system constructed in accordance with the present invention.

Referring now to the drawings and especially to FIG. 1, a system 102 for disturbing, or working, the soil in an agricultural field, as in tilling, disking, harrowing, planting, and the like, is shown therein. As shown, the system includes a tractor 104 provided with a frame 108 which supports a soil working device 106. The soil working device 106 is provided with at least one soil engagement tool 110, in the illustrated instance a plow 110a, which is movably connected to the frame 108. An actuator assembly 160 supported by the tractor 104 is connected intermediate the frame 108 and the soil working device 106, and is used to change position of the soil working device 106 with respect to the frame 108 and thereby change position (depth and/or angle) of the tool 110 with respect to the soil. The position of the tool 110 is controlled by varying the displacement of the actuator assembly 160 in response to a proportional actuation signal received from a tool position controller 158 which is supported by the tractor 104 and to which the actuator assembly 160 is connected.

In a preferred embodiment, and as shown in FIG. 1, the actuator assembly 160 includes the form of four-bar linkage 170 known as a three-point hitch and commonly supplied on agricultural tractors with one or more hydraulic cylinder actuators 164 provided with a source 168 of pressurized hydraulic fluid. A solenoid valve 176 may be provided intermediate the hydraulic fluid source 168 and the hydraulic cylinder 164, and may be configured to stably control hydraulic fluid flow rate in correspondence to the proportional actuation signal received by the solenoid valve 176 from the tool position controller 158. For control of force produced by the solenoid and thereby extent of opening of the valve, the proportional actuation signal is preferably, but not necessarily, of the pulse width modulated (PWM) type.

The tool position controller 158 generates the proportional actuation signal in response to a tool 110 position set point command signal received from a data processing unit (DPU) 114. DPU 114 reads the desired tool 110 positions, or set points, from a data base stored in a portable memory device 116 supported by the tractor 104 or, alternatively, in a remote computer 136 (not shown) via wireless data link. The data base may be a layer of a geographic information system (GIS) map, and contains tool 110 position set point data for a plurality of locations within the field, the locations being identified with global positioning system (GPS) coordinates and this location data being correlated with the corresponding tool 110 position data. DPU 114 reads the tool 110 present location signal received from a location sensing circuit 124, looks up that location in the data base, reads the corresponding tool 110 position set point data, and sends it to the tool position controller 158 as a set point command signal. The controller 158 may provide open loop control of tool 110 position or, if desired, closed loop control using a tool 110 position feedback signal from a tool position sensor 162 as shown in FIG. 1 by dotted line 162a.

Figure 2:
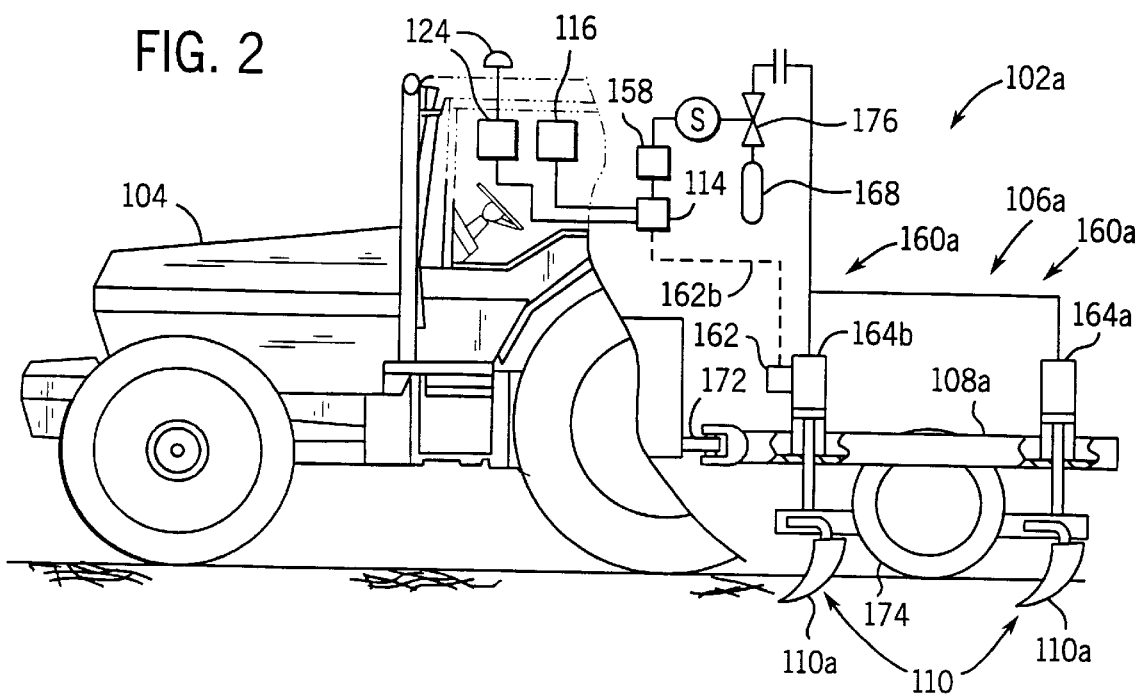
FIG. 2 is a fragmentary side elevation view of another embodiment of a site-specific farming system constructed in accordance with the present invention.

Referring now to FIG. 2, a system 102a for working the soil in an agricultural field includes a soil working device, or implement, 106a comprising a frame 108a to which are movably mounted one or more agricultural tools 110a. The frame 108a is connected to the draw bar hitch 172 of a tractor 104 or other agricultural vehicle, and is moved through the field by the vehicle upon wheels 174 by which it rides upon the surface of the soil and thereby remains at a fixed height above the surface of the soil. An actuator assembly 160a, supported by the soil working device 106a, is connected intermediate the frame 108a and the tool 110a, and may be used to controllably vary position (depth and/or angle) of engagement of the tool 110a with the soil by changing position of the tool 110a with respect to the frame 108a. The actuator assembly 160a may include one or more hydraulic cylinders, lead screw or ball screw linear actuators, or like extending and contracting devices. Position of the tool 110a is controlled by varying the displacement of the actuator assembly 160a in response to a proportional actuation signal received from a tool position controller 158 which is supported by the tractor 104 and to which the actuator assembly 160a is connected.

In the preferred embodiment, the actuator assembly 160a is seen to include one or more hydraulic cylinders; in the illustrated instance, two: 164a and 164b. The cylinders 164a and 164b are connected in parallel to a pressurized hydraulic fluid source 168 supported by either the tractor 104 or the implement 106a. The actuator assembly 160a further includes a solenoid valve 176 configured to stably modulate or throttle flow in proportion to the proportional actuation signal received by the solenoid valve 176 from tool position controller 158. For control of force produced by the solenoid and thereby extent of opening of the valve, the proportional actuation signal is preferably, but not necessarily, of the pulse width modulated (PWM) type.

The tool position controller 158 generates the proportional actuation signal in response to a tool 110a position set point command signal received from a data processing unit (DPU) 114. DPU 114 reads desired tool 110a positions, or set points, from a data base stored in a portable memory device 116 supported by the tractor 104 or, alternatively, in a remote computer 136 (shown in FIG. 3 and discussed below) via wireless data link. The data base may be a layer of a geographic information system (GIS) map, and contains tool 110a position set point data for a large number of locations within the field, the locations being identified with global positioning system (GPS) coordinates and this location data being correlated with the corresponding tool 110a position data. DPU 114 reads the tool 110a present location signal received from a location sensing circuit 124, looks up that location in the data base, reads the corresponding tool 110a position set point data, and sends it to tool position controller 158 as a set point command signal. Controller 158 may provide open loop control of tool 110a position or, if desired, closed loop control using a tool 110a position feedback signal obtained from a tool position sensor 162 as shown by dotted line 162b.

Figure 3:
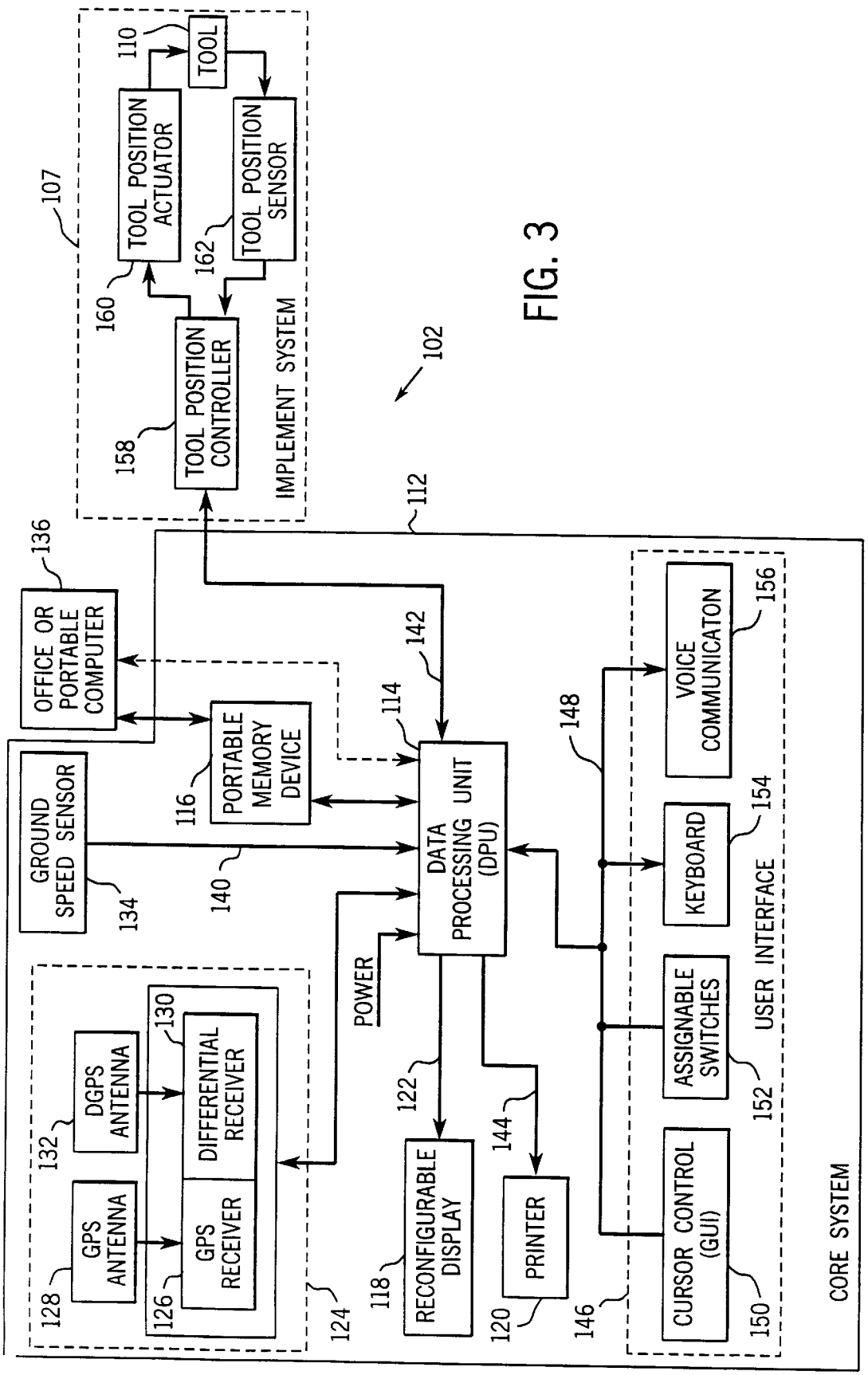
FIG. 3 is a block diagram of a site-specific farming system in conformance with FIG. 1 and 2 of the present invention.

Referring now to FIG. 3, a site-specific farming system 102 includes one or more core systems 112 which provide data processing functions for agricultural vehicles 104 (shown in FIG. 1 and 2) which support or are connected to soil working implements 106a (shown in FIG. 1) and 106a (shown in FIG. 2). In farming system 102, each vehicle 104 is equipped with its own core system 112 and with one or more implements 106 (FIG. 1) appropriate for the task at hand. Core system 112 of the vehicle 104 communicates with an implement system 107 over bus 142 for control of tool 110 position upon implement 106. A core system 112 is connected to an implement system 107 and its DPU 114 acts as the control circuit for the farming system 102.

Preferably, core system 112 is removable and can be installed on a variety of agricultural vehicles. When installed on a tractor 104 equipped with an implement 106, core system 112 can be configured to operate in an "apply" mode wherein it may control, apply, and display data previously recorded off line. Alternatively, core system 112 can be configured to operate in a general "data collection" mode wherein it collects, records and displays data of field or crop characteristics being measured in real time. The displayed data may include either the previously recorded data (e.g., a prescription map) or data being measured in real time.

Core system 112 may also provide directional or locational assistance during application of field inputs such as tillage or seed planting depth and/or spacing in response to data of parameters (e.g., crop yield, crop and/or soil moisture, top soil depth, soil constituent analysis, slope, soil compaction, drain tile location, etc.) stored in one or more layers of a data base application program such as a GIS map.

Farming system 102 also includes a workstation or personal computer 136 which may be fixed and located in a farm office or may be portable. A medium of communication is used to transfer site-specific data between core system 112 and computer 136. Preferably, core system 112 and computer 136 each include a read/write interface (not shown) for a portable memory device 116 which can be transported between core system 112 and computer 136. Memory devices 116 may be Type II PCMCIA cards made by Centennial Technologies, Inc. However, other mediums of communication (e.g., floppy or hard disk, RF, infrared, RS-232/485 links etc.) may be used. Portable memory device 116 may be used to transfer site-specific data from core system 112 to computer 136, and to transfer prescription maps from computer 136 to core system 112.

Core system 112 includes a digital data processing unit (DPU) 114 which communicates with the vehicle operator through a user interface 146 via links 148 (e.g., an RS-232/485 interface and a standard keyboard interface). DPU 114 may be a PC CPU and include a microprocessor, a system clock, non-volatile memory (e.g., PROM, EPROM or FLASH), volatile memory (RAM), and a power supply. The microprocessor executes a program stored in non-volatile memory. The volatile memory may be provided with a battery back-up circuit. Alternatively, DPU 114 may be implemented using dedicated, specific purpose equipment or hard-wired logic circuitry. User interface 146 may include a graphical user interface (GUI) 150 providing cursor control (e.g., a mouse, joystick, or four-way switch with up, down, right, and left positions), assignable switches 152 (e.g., push buttons) configurable by the processor, a keyboard 154, and/or a voice-communication interface 156.

DPU 114 is configured to generate display signals which are applied to a reconfigurable display 118 (e.g., a CRT or a flat screen LCD display) via a communication link 122. Display 118 is preferably an active matrix LCD capable of displaying full-motion video and a number of colors under varying ambient light conditions. Display 118 is also capable of displaying graphics and alpha-numeric characters. Display 118 is used to display, inter alia, the current configurations of assignable switches 152. DPU 114, user interface 146, and display 118 are located in the vehicle cab such that the operator has easy access to user interface 146 and a substantially unobstructed view of display 118. Core system 112 may also include a printer 120 in the cab which communicates with DPU 114 via an interface 144 (e.g., an RS-232 link).

DPU 114 may receive signals representing the speed of the vehicle from a ground speed sensor 134 via an interface 140 (e.g., a frequency interface). The ground speed sensor 134 may be an existing vehicle ground speed measuring apparatus, or may include a magnetic pickup sensor configured to sense the speed of the vehicle's wheels or transmission, or may include a radar device mounted to the body of the vehicle. The speed signals may be displayed or recorded, and may be used by DPU 114 to calculate distance traveled.

DPU 114 also communicates with a location signal generation circuit 124 which generates signals representing the vehicle's location within the field. The location signal generation circuit 124 includes a global positioning system (GPS) signal receiver 126 with an associated antenna 128, and a differential GPS (DGPS) signal receiver 130 with an associated antenna 132. A single antenna may be used in place of antennas 128 and 132. GPS receiver 126 may, for example, be manufactured by Trimble Navigation Ltd. of California, and DGPS receiver 130 may be manufactured by Satloc, Inc. of Arizona. GPS receiver 126 determines longitude and latitude coordinates (and altitude) of the vehicle from signals transmitted by the GPS satellite network. The accuracy of the location data is improved by applying correction signals received by DGPS receiver 130. The differential correction signals are used to correct errors present on GPS signals including the selective availability error signal added to GPS signals by the U.S. government. DGPS signals are transmitted by the U.S. Coast Guard and by commercial services. For example, the Omnistar DGPS system from John E. Chance & Assoc. of Texas includes a network of ten land-based differential reference stations that send correction signals to a master station which uploads signals to a satellite for broadcast throughout North America. GPS differential correction signals may also be transmitted from a local base station such as the top of a building. In a preferred embodiment, DPU 114 interfaces with SATLOC L-Band Integrated Terra Star DGPS System via an RS-485 communication link.

When core system 112 is mounted on a tractor 104, DPU 114 communicates with an implement system 107 via bus 142. Implement system 107 may include one or more tool position controllers 158, tool position actuators 160, and tool position sensors 162. DPU 114 reads tool 110 position data for a particular field location from a prescription map (which may be supplied by computer 136), or reads an input device such as a potentiometer (not shown) used to manually set a desired tool 110 position, and generates corresponding tool 110 position set point command signals which are sent to the tool position controller 158. In response, the controller 158 generates proportional actuation signals which are applied to the tool position actuator 160. The proportional actuation signal is preferably of pulse width modulated (PWM) type. A tool position sensor 162 may be used to provide a feedback signal, representing the actual tool 110 position, to controller 158 in order to enable closed-loop control. Bus 142 may be an RS-485 bus for a single-channel controller, or an SAE J-1939 implement bus for a multiple-channel controller.

The tractor 104 may also include sensors configured to gather site-specific information regarding a characteristic of a field, or of a crop growing thereon, or of the farming operation itself such as ground speed, during field operations and communicate the information to DPU 114. For example, the speed of the tractor 104 pulling a soil working implement 106 through a field, and hence of implement 106 itself, may be measured and recorded as the field is worked. The actual measured signals from the sensors may be processed by DPU 114 to form data representative of the desired characteristic. This data may be correlated with location data representative of the location signals received from location signal generation circuit 124 and the correlated data may be stored in memory device 116.

Core system 112 may communicate with other vehicle systems over a vehicle data bus (not shown). Preferably, the vehicle data bus conforms to the Society of Automotive Engineers (SAE) Standard J-1939 ("Recommended Practice for a serial Control and Communications Vehicle Network"). A bridge circuit may be used to facilitate the transfer of data between the vehicle data bus and a secondary implement bus coupled to implement system 107 and DPU 114. The bridge circuit may be used to filter data between busses, thereby decreasing bus loading.

Figure 4:
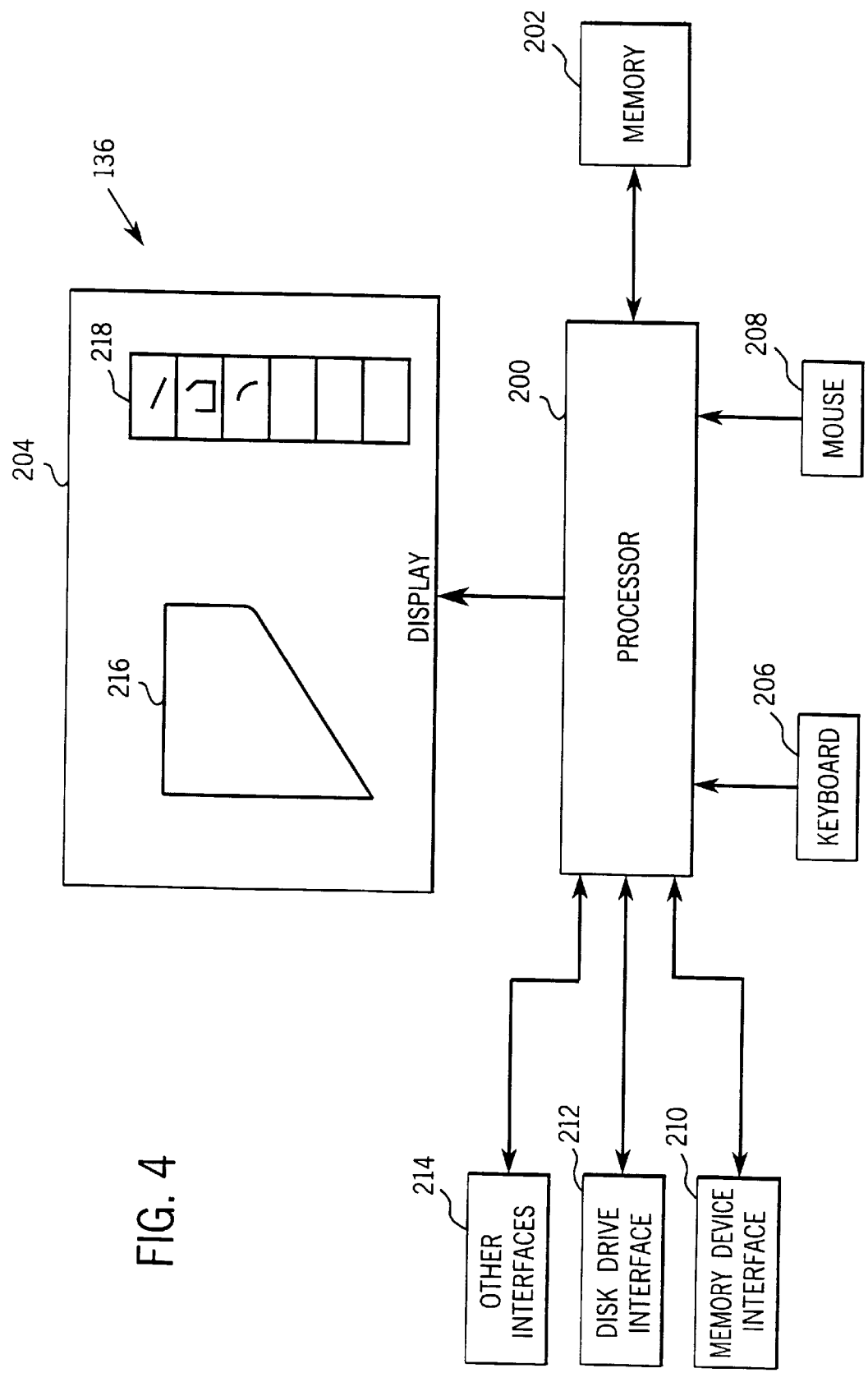
FIG. 4 is a block diagram of the office or portable computer shown in FIG. 3 which can be used to process site-specific farming data.

Referring now to FIG. 4, computer 136 is preferably a programmed personal computer including a processor 200, a memory circuit 202, a color or monochrome display 204, input devices such as a keyboard 206 or a mouse 208, and input/output interfaces such as a memory device interface 210, a hard or floppy disk drive interface 212, and other interfaces 214 (e.g., RF or infrared). An input device such as a joystick, light pen or touch screen may also be used. Alternatively, computer 136 may be implemented using dedicated specific-purpose equipment or hard-wired logic circuitry. Preferably, processor 200 reads precision farming data including tool 110 position and location information from memory device 116 using memory device interface 210. Data may also be entered using keyboard 206, mouse 208, disk drive interface 212, or another interface 214.

Processor 200 generates display signals which, when applied to display 204, cause visual alphanumeric and graphical indicia to be displayed. For example, the display signals may cause display 204 to create a visual map 216 of a field as well as icons 218 representing drawing tools in a toolbox. Preferably, display 204 is a color monitor, but it may also be a monochrome monitor capable of displaying different light intensity levels.

Figure 5:
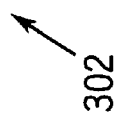
FIG. 5 represents a layer of spatially variable data stored in memory.

FIG. 5 generally represents an example of the structure in which layers of site-specific farming data, in this example representative of tool 110 position, tractor 104 (and therefore tool 110) ground speed, and location within the field, are stored in memory. The data structure may be referred to as a geo-referenced digital map, or as a layer of data. The structure is preferably implemented using a database 302 (e.g., a GIS database) represented by a table, wherein each row represents a data point corresponding to a location in the field. For example, a layer having 5000 data points is represented by a table having 5000 rows. Columns of information are associated with each data point.

A similar structure may be used to store other layers of site-specific farming data. For example, a pH layer may include a row for each data point and columns for pH, longitude, latitude, and altitude. Thus, memory device 116 may contain a layer of data for each site-specific characteristic of a field. The data structure may also include heading information such as vehicle identifier, a farm identifier, a field identifier, a load identifier, and a serial number for hardware components of farming system 102 (e.g., an implement serial number). A similar data structure is used to store harvest data generated by combines as well as application data. The data are preferably stored as DOS files in memory device 116.

Figure 6:
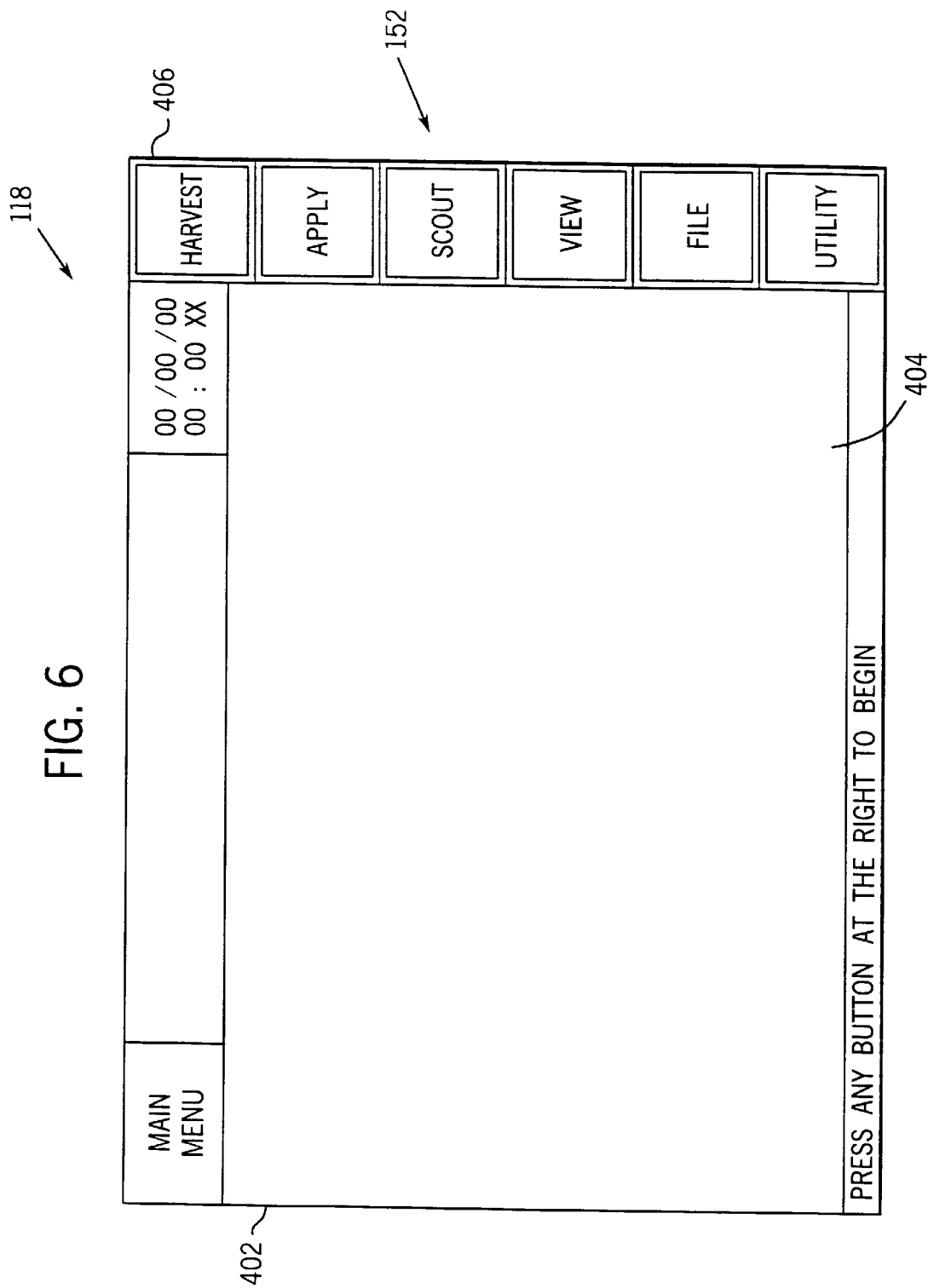
FIG. 6 shows a main menu screen on the electronic display shown in FIG. 3.

Site-specific farming system 102 operates in one of several modes selected by the operator. Referring now to FIG. 6, DPU 114 generates display signals after power is applied to farming system 102 which cause display 118 to present a main menu screen in the vehicle cab. A screen 402 of display 118 includes a map display area 404 which displays an introductory message (not shown) and a graphical operator interface 406 which shows the initial configuration of assignable switches 152. On power up, the switches are assigned functions which correspond to the operating modes of DPU 114 including HARVEST, APPLY, SCOUT and alternatively DATA COLLECTION (not shown). DPU 114 reads signals generated in response to operator actuation of one of the switches 152, decodes the signals, and enters the selected mode of operation.

When farming system 102 is configured to provide farming inputs to a field, the switch 152 corresponding to APPLY in FIG. 6 is actuated. Referring now to FIG. 7, DPU 114, in response, enters into APPLY mode and generates display signals which cause display 118 to show an APPLY screen. DPU 114 also changes the configuration of switches 152, and generates display signals causing operator interface 406 to generate visible indicia showing the new states or configurations of switches 152. As shown in FIG. 7, assignable switches 152 have been re-defined to generate input signals which relate to applying field inputs (e.g., "APPLY OFF", "CHANGE LOAD/SWATH", "APPLY REPORT").

Still referring to FIG. 7, the display signals also cause display 118 to show a legend block 408, a data block 420 for alphanumeric display of data, a compass indicator 410 to show the heading of the vehicle, a map scale 412, and a status line 414 for displaying status information such as the operating mode ("HARVEST", "APPLY", "DATA COLLECTION" or "SCOUT"), the vehicle speed, time remaining in memory device 116, GPS and DGPS status (e.g., good or bad) and date/time. The graphical symbols and their positions within screen 402 are shown for illustration only and may be modified. For example, map display area 404 may cover any portion or all of screen 402 with other displayed information superimposed or suppressed if necessary.

FIG. 7 represents an exemplary display when core system 112 is mounted on a tractor 104 which supports or is connected to a soil working implement 106 such as a plow and the tractor 104 is applying field tilling inputs. In this example, the boundaries of the field being worked are defined and are stored in memory 116. After entering the APPLY mode of operation, in response to actuation of one of assignable switches 152, DPU 114 accesses the longitude, latitude, and altitude coordinates of the field boundary from memory 116 and scales the field boundary to substantially correspond to a portion of the map display area 404. DPU 114 scales the boundary data and produces display signals which, when applied to the display 118, generate a visible map 416 of the field within the portion of the map display area 404. The portion of the map display area 404 which is actually used to display the map 416 may be 80% or 90% of the size of the map display area 404, with the percentage selected to enhance the visual appearance of the map 416. However, any percentage value may be used which provides a desirable appearance, including 100%, and the percentage may be made user selectable. The scale of the map 416 is displayed at the map scale 412 (e.g. 100 ft/inch).

At the start of the plowing process, the tractor 104 was located at the upper-right hand corner of map 416. The tractor 104 then made a number of passes through the field, turning at the headlands (located at the boundaries of map 416). The current location of the tractor 104 is marked by an icon 418, such as an arrow which also indicates the direction of travel which may be determined from changes in the location data. Other icons may be used, such as an image of a tractor. Throughout the plowing process, DPU 114 applies site-specific tool 110 position data stored in memory device 116 correlated with corresponding location data, and selects data points using signals from present location signal generation circuit 124.

To accurately correlate present location data with stored tool 110 position and location data correlated pairs, DPU 114 is preferably programmed with variables, which may be set by the operator, which indicate the distance and direction between GPS antenna 128 and the tool 110. This information is used as an offset to the stored location data. In one embodiment, DPU 114 maintains a buffer of the last 20 locations received, and selects a location to use based upon the delay value.

In the case of a plurality of tools 110, each of which is desired to be controlled in depth and/or angle of engagement with the soil independently of other tools 110, each tool 110 may be provided a control channel and DPU 114 programmed with the corresponding plurality of distances and directions between GPS antenna 128 and each tool 110. An implement having a plurality of soil engaging devices may therefore have an actuator, memory circuit tool position data file, control circuit, and related apparatus for each device, whereby the depth and/or angle of engagement of each device with the soil is independent of the depth and/or angle of engagement of each other device and is controlled independently in conformance with the depth and/or angle data stored or generated within a prescription map file or program.

Graphical operator interface 406 includes a label which shows the assignment currently selected for each switch 152. The label and assignment depend on the mode of operation of DPU 114. Indicator 410 is an electronic compass which shows the current direction or heading of the vehicle with respect to north (e.g., northeast in FIG. 7). DPU 114 may calculate the heading based on a vector from the previous location of the vehicle to the current location. Appropriate filtering should be used to keep the compass from moving or dithering due to GPS errors when the vehicle is not moving. Alternatively, the vehicle may be equipped with a compass or gyroscope electronically interfaced with DPU 114. In FIG. 7, the orientation of the display shows the vehicle going up and down as it travels northeast. However, the orientation of the display could also be geographic (e.g., north up).

Still referring to FIG. 7, status line 414 displays "APPLY" to indicate that DPU 114 is operating in APPLY mode, and operator interface 406 indicates that assignable or redefinable switches 152 are configured to generate input signals relating to application (e.g., "APPLY OFF", "CHANGE LOAD/SWATH ", "APPLY REPORT").

Preferably, DPU 114, display 118 and switches 152 are packaged in an integrated assembly such that display 118 provides labels showing assignments of switches 152. However, switches 152 could be housed in a keyboard external to the housing assembly of DPU 114.

While the embodiments illustrated in the Figures and described above are presently preferred, it should be understood that these embodiments are offered by way of example only. For example, voice-communication interface 156 can be used to generate command signals instead of switches 152 to further simplify the operator interface by allowing an operator to issue a command by speaking its name (e.g., "Apply."). An implement having a plurality of soil engaging devices may have an actuator, memory circuit tool position data file, control circuit, and related apparatus for each device, whereby the depth and/or angle of engagement of each device with the soil is independent of the depth and/or angle of engagement of each other device and is controlled independently in conformance with the depth and/or angle data stored or generated within a prescription map file or program. The invention is not intended to be limited to any particular embodiment, but is intended to extend to various modifications that nevertheless fall within the scope of the appended claims.

What is claimed is:

1. A system for controlling the position of an agricultural tool coupled to an agricultural vehicle, the tool being moveable by a positioning assembly configured to position the tool with respect to the soil of an agricultural field in response to tool position signals, the system comprising:

a location signal generation circuit supported by the vehicle and configured to receive positioning signals and to generate location signals therefrom which are representative of the geographic location of the tool;

a memory circuit configured to store geo-referenced tool position data including desired tool positions; and a control circuit coupled to the location signal generation circuit, the memory circuit and the positioning assembly, the control circuit configured to receive the location signals, correlate the location signals with the geo-referenced tool position data, and generate the tool position signals based on the correlated data to change the position of the tool.

2. The system of claim 1, further comprising an operator input device configured to receive an operator input representative of a desired tool position, the control circuit configured to generate the tool position signals based on one of the operator input and the correlated data to change the position of the tool.

3. The system of claim 1, wherein the tool position signals cause the positioning assembly to change the angle of the tool.

4. The system of claim 1, wherein the tool position signals cause the positioning assembly to change the height of the tool.

5. The system of claim 1, wherein the geo-referenced tool position data includes data points, each data point including a location field and a tool position field, the tool position field including a value corresponding to the desired tool position.

6. The system of claim 1, wherein the control circuit is further configured to generate the tool position signals based on a variable representative of the distance between an antenna coupled to the location circuit and the tool.

7. The system of claim 1, wherein the location signal generation circuit receives global positioning system (GPS) signals and generates the location signals therefrom.

8. The system of claim 1, the system further comprising a tool position sensor coupled to the tool and configured to provide a position feedback signal to the control circuit, the control circuit configured to generate the tool position signals based on the position feedback signal.

9. The system of claim 1, wherein the memory circuit is configured to store a second set of geo-referenced tool position data for a second tool, the control circuit configured to correlate the location signals with the second set of geo-referenced tool position data and control the position of the second tool independently of the tool position signals generated for the first tool.

10. A system for controlling the position of an agricultural tool coupled to an agricultural vehicle, the tool being moveable by a positioning assembly configured to position the tool with respect to the soil of an agricultural field in response to tool position signals, the system comprising:

means for receiving positioning signals and generating location signals therefrom which are representative of the geographic location of the tool;

means for storing geo-referenced tool position data including desired tool positions; and means for receiving the location signals, correlating the location signals with the geo-referenced tool position data, and generating the tool position signals based on the correlated data to change the position of the tool.

11. The system of claim 10, further comprising a means for receiving an operator input representative of a desired tool position; and means for generating the tool position signals based on one of the operator input and the correlated data to change the position of the tool.

12. The system of claim 10, wherein the tool position signals cause the positioning assembly to change the angle of the tool.

13. The system of claim 10, wherein the tool position signals cause the positioning assembly to change the height of the tool.

14. The system of claim 10, wherein the geo-referenced tool position data includes data points, each data point including a location field and a tool position field, the tool position field including a value corresponding to the desired tool position.

15. The system of claim 10, further comprising means for generating the tool position signals based on a variable representative of the distance between an antenna coupled to the location circuit and the tool.

16. The system of claim 10, further comprising means for receiving global positioning system (GPS) signals and generating the location signals therefrom.

17. The system of claim 10, further comprising:

means for generating a position feedback signal; and means for generating the tool position signals based on the position feedback signal.

18. The system of claim 10, further comprising:

means for storing a second set of geo-referenced tool position data for a second tool; and means for correlating the location signals with the second set of geo-referenced tool position data and controlling the position of the second tool independently of the tool position signals generated for the first tool.

19. A method of controlling the position of an agricultural tool coupled to an agricultural vehicle, the tool being moveable in response to tool position signals, the method comprising:

receiving positioning signals and generating location signals therefrom which are representative of the geographic location of the tool;

storing geo-referenced tool position data including desired tool positions;

correlating the location signals with the geo-referenced tool position data; and generating the tool position signals based on the correlated data to change the position of the tool.

20. The method of claim 19, further comprising:

receiving an operator input representative of a desired tool position, and generating the tool position signals based on one of the operator input and the correlated data to change the position of the tool.

21. The method of claim 19, wherein the tool position signals change the angle of the tool.

22. The method of claim 19, where in the tool position signals change the height of the tool.

23. The method of claim 19, wherein the geo-referenced tool position data includes data points, each data point including a location field and a tool position field, the tool position field including a value corresponding to the desired tool position.

24. The method of claim 19, further comprising generating the tool position signals based on a variable representative of the distance between an antenna coupled to the location circuit and the tool.

25. The method of claim 19, further comprising receiving global positioning system (GPS) signals and generating the location signals therefrom.

26. The method of claim 19, further comprising generating a position feedback signal based on an actual position of the tool and generating the tool position signals based on the position feedback signal.

27. The method of claim 19, further comprising:

storing a second set of geo-referenced tool position data for a second tool;

correlating the location signals with the second set of geo-referenced tool position data; and controlling the position of the second tool independently of the tool position signals generated for the first tool.

* * * * *